(12) United States Patent
Johansen et al.

(10) Patent No.: US 10,197,589 B2
(45) Date of Patent: Feb. 5, 2019

(54) DISPLACEMENT SENSOR DEVICE AND SYSTEM

(71) Applicant: PGS Geophysical AS, Oslo (NO)

(72) Inventors: Ib-Rune Johansen, Oslo (NO); Matthieu Lacolle, Nesøya (NO); Thor Bakke, Lysaker (NO); Andreas Vogl, Oslo (NO); Dag Thorstein Wang, Oslo (NO); Sverre Knudsen, Trondheim (NO); Odd Løvhaugen, Oslo (NO); Hallvard Angelskår, Olso (NO); Zeljko Skokic, Oslo (NO)

(73) Assignee: PGS Geophysical AS, Oslo (NO)

( * ) Notice: Subject to any disclaimer, the term of this patent is extended or adjusted under 35 U.S.C. 154(b) by 171 days.

(21) Appl. No.: 15/122,052

(22) PCT Filed: Feb. 26, 2015

(86) PCT No.: PCT/EP2015/054069
§ 371 (c)(1),
(2) Date: Aug. 26, 2016

(87) PCT Pub. No.: WO2015/128431
PCT Pub. Date: Sep. 3, 2015

(65) Prior Publication Data
US 2017/0016931 A1     Jan. 19, 2017

(30) Foreign Application Priority Data

Feb. 28, 2014   (NO) .................................. 20140263

(51) Int. Cl.
*G01P 15/093*     (2006.01)
*G01P 15/18*      (2013.01)
(Continued)

(52) U.S. Cl.
CPC .............. *G01P 15/093* (2013.01); *G01D 5/38* (2013.01); *G01P 15/18* (2013.01); *G02B 5/1828* (2013.01); *G02B 26/0808* (2013.01)

(58) Field of Classification Search
CPC ......... G01P 15/093; G01P 15/18; G01D 5/38; G02B 5/1828; G02B 26/0808
See application file for complete search history.

(56) References Cited

U.S. PATENT DOCUMENTS 4,332,473 A * 6/1982 Ono ......................... G01D 5/38
                                              250/237 G
4,631,416 A * 12/1986 Trutna, Jr. ............ G03F 9/7049
                                              250/237 G (Continued)

FOREIGN PATENT DOCUMENTS

EP      0575641      12/1993
EP      2482040       8/2012

(Continued)

OTHER PUBLICATIONS

International Preliminary Report on Patentability for related PCT Application PCT/EP2015/054069, dated Sep. 6, 2016 (7 pgs).

(Continued)

*Primary Examiner* — Helen C Kwok

(57) ABSTRACT

The present invention relates to a displacement sensor device and the system including the device, wherein the device comprises a first at least partially transparent plane surface with a first diffraction pattern and a second plane surface comprising a second reflecting diffraction pattern. The diffractive patterns being adapted to diffract light within a chosen range of wavelengths, the second surface being positioned below and parallel to the first surface constituting a pair wherein said first and second diffractive patterns being essentially equal, the device also comprising displacement (Continued)

means for allowing a movement in a direction parallel to said surfaces, the device thus providing a movement sensitive diffraction pattern.

24 Claims, 17 Drawing Sheets

(51) Int. Cl.
*G02B 5/18* (2006.01)
*G02B 26/08* (2006.01)
*G01D 5/38* (2006.01)

(56) References Cited

U.S. PATENT DOCUMENTS

| | | | | |
|---|---|---|---|---|
| 4,815,850 | A * | 3/1989 | Kanayama | G01D 5/38 356/488 |
| 5,661,295 | A * | 8/1997 | Fukui | G01D 5/38 250/231.14 |
| 6,424,407 | B1 * | 7/2002 | Kinrot | G01D 5/347 345/166 |
| 6,473,187 | B1 * | 10/2002 | Manalis | G01P 15/093 356/521 |
| 6,819,426 | B2 * | 11/2004 | Sezginer | G03F 7/70633 356/400 |
| 7,173,764 | B2 | 2/2007 | Carr et al. | |
| 7,184,368 | B2 * | 2/2007 | Johansen | H04R 23/008 367/149 |
| 7,262,851 | B2 * | 8/2007 | Kuroda | B82Y 10/00 356/401 |
| 7,339,738 | B1 * | 3/2008 | Carr | G02B 5/1828 359/291 |
| 7,355,720 | B1 * | 4/2008 | Carr | G01H 9/004 356/498 |
| 7,583,390 | B2 * | 9/2009 | Carr | G01L 9/0079 356/35.5 |
| 8,674,689 | B1 * | 3/2014 | Nielson | G01R 33/032 324/244.1 |
| 9,702,992 | B2 * | 7/2017 | Avenson | G01V 1/181 |
| 2003/0128361 | A1 * | 7/2003 | Kuroda' | G03F 9/703 356/400 |
| 2004/0130728 | A1 | 7/2004 | Degertekin et al. | |
| 2005/0018541 | A1 | 1/2005 | Johansen et al. | |
| 2005/0105098 | A1 * | 5/2005 | Johansen | G01L 9/0079 356/506 |
| 2005/0192976 | A1 | 9/2005 | Klein | |
| 2005/0253052 | A1 | 11/2005 | Martenson et al. | |
| 2006/0192976 | A1 * | 8/2006 | Hall | G01D 5/266 356/505 |
| 2009/0044618 | A1 * | 2/2009 | DiFoggio | E21B 47/04 73/152.59 |
| 2011/0194711 | A1 | 8/2011 | Avenson et al. | |
| 2011/0194857 | A1 | 8/2011 | Avenson et al. | |

FOREIGN PATENT DOCUMENTS

| | | |
|---|---|---|
| WO | 0204895 | 1/2002 |
| WO | 2008030681 | 3/2008 |

OTHER PUBLICATIONS

International Search Report & Written Opinion for related PCT Application PCT/EP2015/054069, dated May 6, 2015 (9 pgs).
Lacolle, et al., " Micomachined Optical Microphone Based on a Modulated Diffractive Lens", 3rd of the EOS Topical Meeting on Optical Microsystems; Capri, Sep. 27-30, 2009 (17 pgs).
Stowe, et al., "Demodulation of Interferometric Sensors Using a Fiber-Optic Passive Quadrature Demodulator"; Journal of Lightwave Technology, vol. LT-1, No. 3 (Sep. 1983) (5 pgs).
Brown, et al., "A Symmetric 3×3 Coupler Based Demodulator for Fiber Optic Interferometric Sensors", SPIE, Fiber Dptic and Laser Sensors IX, vol. 1584 (1991) (8 pgs).
Reid, et al., "Multiplex Architecture for 3×3 Coupler Based Fiber Optic Sensors"; SPIE, Distributed and Multiplexed Fiber Optic Sensors, RI, Boston (1993) (10 pgs).
Higurashi, et al., "Micro-Encoder Based on Higher-Order Diffracted Light Interference", Journal of Micromechanics and Microengineering, vol. 15 (Jun. 6, 2005) (7 pgs).

* cited by examiner

DISPLACEMENT SENSOR DEVICE AND SYSTEM

This application is a National Stage Application under 35 U.S.C. § 371 of International Application Number PCT/EP2015/054069, filed Feb. 26, 2015 and published as WO 2015/128431 A1 on Sep. 3, 2015, which claims the benefit to Norwegian Application Number 20140263, filed Feb. 28, 2014, the entire contents of which are incorporated herein by reference in its entirety.

The present invention relates to an optical device and corresponding system for measuring displacement.

Until recently displacement sensors such as accelerometers has been based on capacitor structures and impedance measurements. This has a number of disadvantages related to sensitivity, high voltage biasing, isolation between layers, alignment and positioning of membrane relatively to back electrode, high requirements to preamplifiers, and nonlinear response, all resulting in costly and complicated solutions.

Optical position encoders are able to detect the lateral displacement of a scale relative to a reading head. The reading head includes a light source illuminating a reflective diffraction grating patterned on the scale. The diffraction grating acts as a beam splitter which, associated with other optical components, produces interference fringes on the reading head. These interference fringes moves with the scale and their position can be measured by means of one or several detectors. There are several implementations of such encoders, differing especially in the way the different beams illuminating and diffracted by the grating on the scale are combined to produce interference fringes, such as [1], [2] and [3].

With the aim to integrate a miniaturized position sensor with MEMS devices, another type of grating-based position sensor was invented. In this prior art, the grating consists of a first surface with reflective lines and a reflective unpatterned second surface below. The whole structure can be analysed as a deformable diffractive structure with grooves consisting of two levels: a top level consisting of reflective lines on the first surface and a bottom level consisting of the portion of the second surface underneath the area between the reflective lines of the first surface. As the distance between the two surfaces changes, the height of the grooves of the diffractive structure changes, with the effect of changing its diffraction efficiency, [4], [5].

The way to operate such a position sensor is quite different from [1, 2 & 3]. In this case the grating on the first surface is in a fixed position relative to a reading head placed above the first surface. The illumination is not designed as to produce interference fringes with the grating, but rather to be able to distinguish at least one diffraction order reflected by the grating. One or several photodetectors on the reading head are used to measure light intensity in one or several of these diffraction orders. Note that this diffraction orders are at fixed position an the reading head, as the grating on the first surface is not moving compared to the reading head. But as the diffraction efficiency of the diffractive structure is modulated, the portion of light diffracted to the different diffraction orders is changed. To summarize, a change in the distance between the two surfaces changes the height of the grooves making a deformable diffractive structure, which in turn changes the diffraction efficiency of the diffractive structure, which can be measured by photodetectors placed accordingly on a reading head. Such position sensors can be implemented with linear grating lines [4], or with focusing diffractive patterns focusing a diffraction order onto a detector [5].

Deformable diffractive structures such as [4] and [5] are well suited for the measurement of the distance between two surfaces, but are unable to detect any lateral displacement, as such displacement would not change the shape of the grooves of the diffractive structure. It is thus an object of the present invention to provide measurements related to lateral movements relative to the diffractive patterns or structures.

US2008/0062432 illustrates a solution detecting a lateral movement between two different gratings. In this case the gratings are used for directing the light in a required direction and are position too far apart to provide any optical interaction.

US2006/007440 illustrates a solution for detecting a relative position between two objects having similar gratings, where the diffracted pattern varies with the relative position. As is shown in FIG. 2 in the document the shape of the distribution of the diffracted light intensity is complex and thus reduces the accuracy of the measurements.

Nanomechanical or near-field grating can be used to detect lateral displacements [9 & 10]. These consist of sets of grating lines situated on two parallel surfaces, forming a multitude of apertures whose width and depth are modified by the lateral displacement of one of the surface relative to the other. These devices consist of grating lines that are smaller than the wavelength of the light used to illuminate the device both in width and thickness. The distance between the two surfaces also has to be smaller than the wavelength of the light. In fact, near-field grating do not produce any diffraction order other than the 0th diffraction order (specular reflection), as this would require the period of the grating to beat least equal to the wavelength of the light. As a consequence, near-field grating must be operated in reflection or transmission, and therefore lack the ability to direct the light at predetermined angles by designing appropriated grating periods. In fact, near-field gratings can be understood as apertures, whose transparency can be tuned by moving two nanostructures relative to each other.

The objects of this invention are obtained using a device and system as described above and characterized as stated in the independent claims.

Thus, the deformable diffractive gratings such as the presented invention typically consist of grating lines with width larger than the wavelength of light. For example, in order to give a 1st diffraction order at an incidence angle of 7° in a Lithrow configuration (typical operation angle of our invention), the period of the grating has to be about four times the wavelength of light. Furthermore the distance between the two surfaces on to which diffractive structures are located do not have to be smaller than the wavelength of the wavelength of light, and for practical purposes would be chosen to be separated by several tens of wavelengths (for example 10 to 20 μm with an illumination wavelength of 1 μm). A deformable grating will preferably be used in its 1st or higher diffraction order, as these diffraction orders can be directed in predetermined directions by designing the grating period appropriately. The 1st diffraction order can even be focused onto a detector for example, by using diffractive structures shaped as diffractive lens.

Preferred Embodiment

The subject of the invention is to implement a miniaturized position sensor that can be integrated with MEMS devices, and that is sensitive to lateral displacements between two surfaces. This is achieved by patterning a first at least partially-transparent surface with a diffractive pattern (called here top diffractive pattern), and patterning the second surfaces with a diffractive pattern matching the pattern on the first surface (called here bottom diffractive pattern). The second surface can be either patterned with reflective lines on an at least partially transparent surface or with grooves etched on a reflective surface. As an alternative the patterns may also be refractive, or transparent, diffractive patterns where the detectors may be positioned on the opposite side of the pair from the light source. The top and bottom patterns form a deformable diffractive structure, that can be approximated by a diffractive element, where the lines stay at fixed position, but where the shape of the grooves is modified as the to and bottom patterns are displaced relative to each other in a direction in plane with the surfaces and orthogonal with the diffractive lines. As the bottom diffractive pattern moves relative to the top diffractive pattern on the first surface, the shape of the grooves of the diffractive structure will be modified and the diffraction efficiency of the diffractive structure will be modulated. This can be measured by photodetectors on a reading head in the same way as [4] and [5].

The invention will be described more in detail below with reference to the accompanying drawings illustrating the invention by way of examples.

Figure 1:
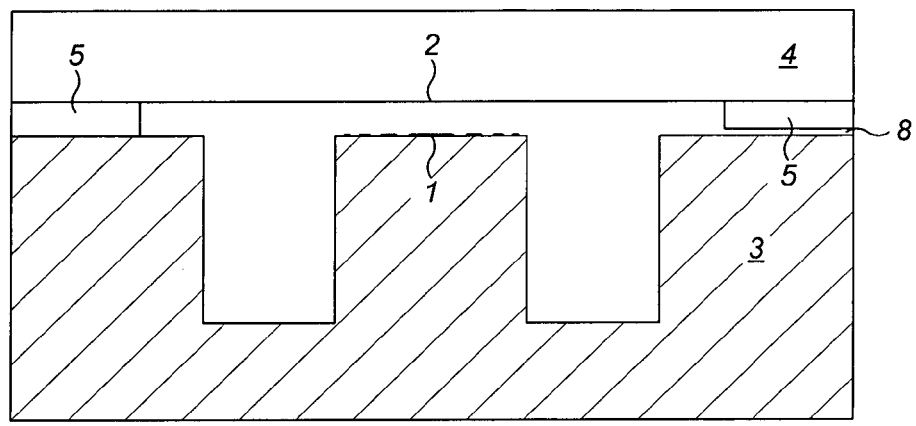
FIG. 1-2 illustrate examples of the prior art.

According to the invention the first surface consists of reflective grating lines, preferably deposited on a transparent surface or with openings between them. The second surface may consist of grating lines etched $\lambda/4$ on a fully reflective surface, and where the etched pattern matches the reflective grating lines on the first surface as is illustrated in FIG. 1, illustrating the known an from U.S. Pat. No. 7,184,368. Under restrictive assumptions on the distance between the two surfaces compared to the grating line period and the angle of incidence of me light incident onto the first surface, the structure can be approximated to a diffractive structure with a groove shape shown in FIG. 2. The validity of this assumption must be checked by running full-field simulation of the structure. As an example we have found that a grating period down to 4 µm, a distance between the two surfaces up to 20 µm and an incidence angle up to approximately 7° would give a satisfying behaviour at a wavelength $\lambda$ around 1 µm. The light source used for illumination according to the invention is preferably being collimated and essentially monochromatic at a chosen wavelength $\lambda$ (lambda).

Under this approximation, it is easy to derive the diffraction efficiency of the equivalent diffractive structure using the scalar diffraction theory, for example using Franhofer diffraction formula. It results that the diffraction efficiency varies as the shape of each groove of the equivalent diffractive structure is modified as a result of the displacement of the second surface relative to the first surface, in a direction perpendicular with the grating grooves and in-plane with the two surfaces.

Figure 2:
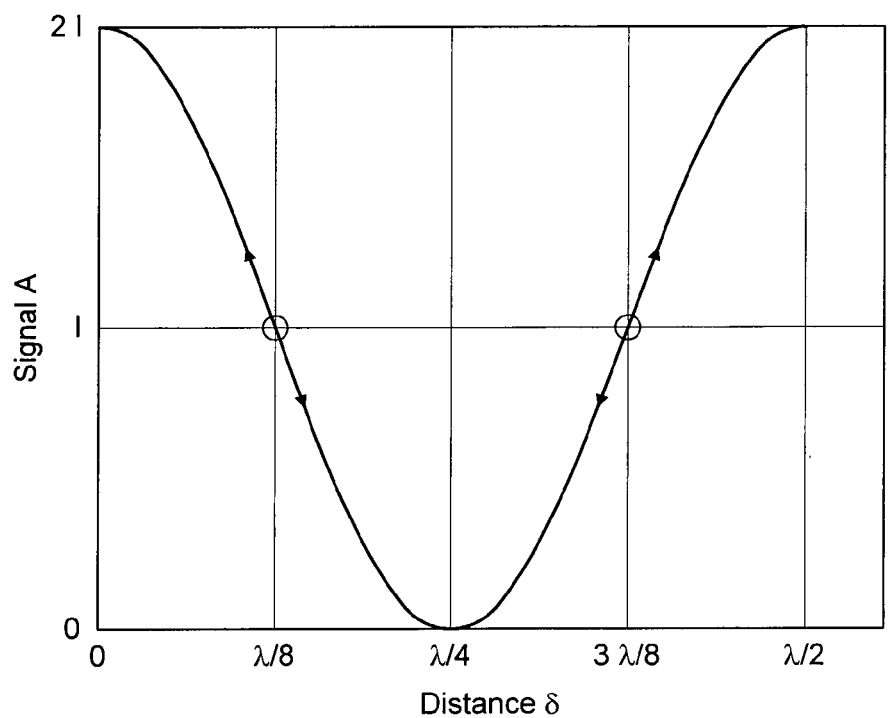

The variation in diffraction efficiency for grooves shaped as in FIGS. 1 and 2 is close a sine signal, with a period corresponding to a lateral displacement equals to a period of the diffractive pattern lines.

The variation in diffraction efficiency can easily be measured by measuring light reflected or diffracted in one or several diffraction orders of the diffractive structure. The modulation in light intensity in the first diffraction order associated with the structure described above is close to a sine signal. A possible implementation of a reading head is shown in FIG. 1.

In a variation of the preferred embodiment, it is possible to use a diffractive pattern consisting of a diffractive Fresnel lens lines on the first surface 101 and matching grooves on the second surface 102. This has the advantage of simplifying the rest of the optical system, by allowing the use of a point source (such as VCSEL) and a photodetector placed so that light diffracted in the −1st order is focused onto, making possible a high throughput without the use of additional components such as lenses. A disadvantage is that the patterns on the two surfaces 101,102 will not match perfectly when the displacement between the two surfaces increases, with the adverse effect of decreasing the modulation in diffraction efficiency as the displacement increases and limiting somewhat the usable range of displacement that can be measured. But in practice adequate design can ensure the displacement can be measured even when exceeding several grating periods.

The described displacement sensor can also be used to measure vertical displacements, that is to say the distance between the two surfaces. A variation in this distance will indeed also modify the shape of the grooves of the equivalent grating and thus modulates its diffraction efficiency. However, this can also be achieved without patterning the second surface, as described in ref patent [4] and [5], and is not the subject of this invention.

In order to cancel variation in illumination intensity, it can be useful to measure the diffraction efficiencies of two diffraction orders giving signals with a 180° phase shift, such as the 0th order (specular reflection) and +/−1st order. Subtracting one signal from the other (after scaling by a constant factor) gives a signal that is not influenced by variation on the illumination intensity.

Figure 3:
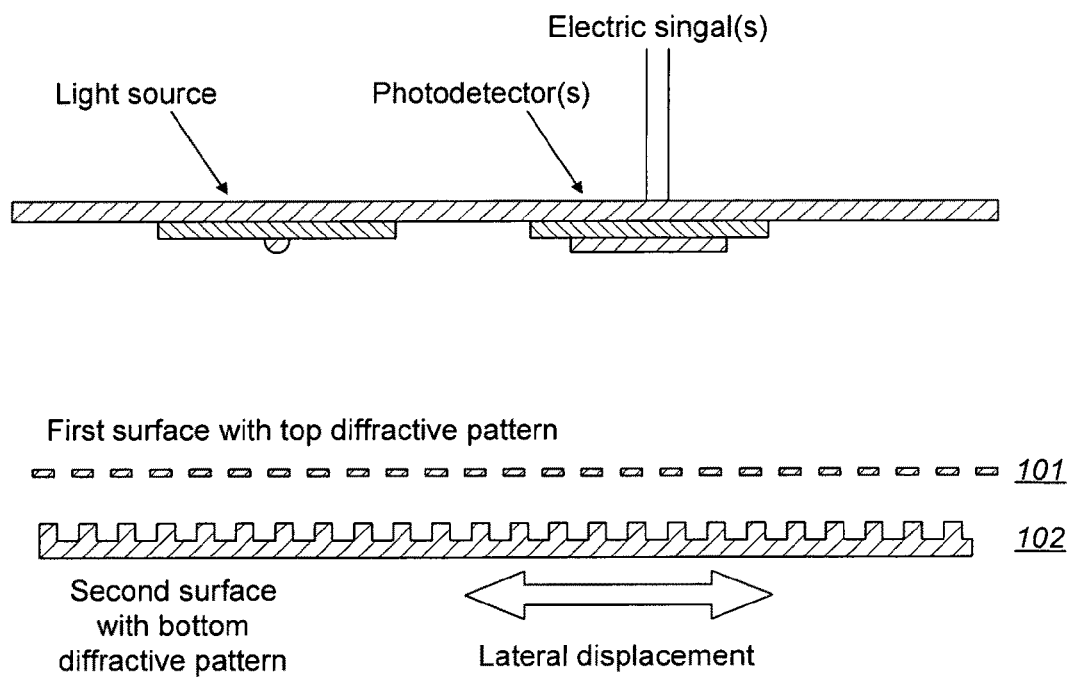
FIG. 3 illustrates a preferred embodiment of the invention where the grating lines of the top diffractive pattern may be placed on a transparent substrate for the sake of mechanical integrity.
Figure 4:
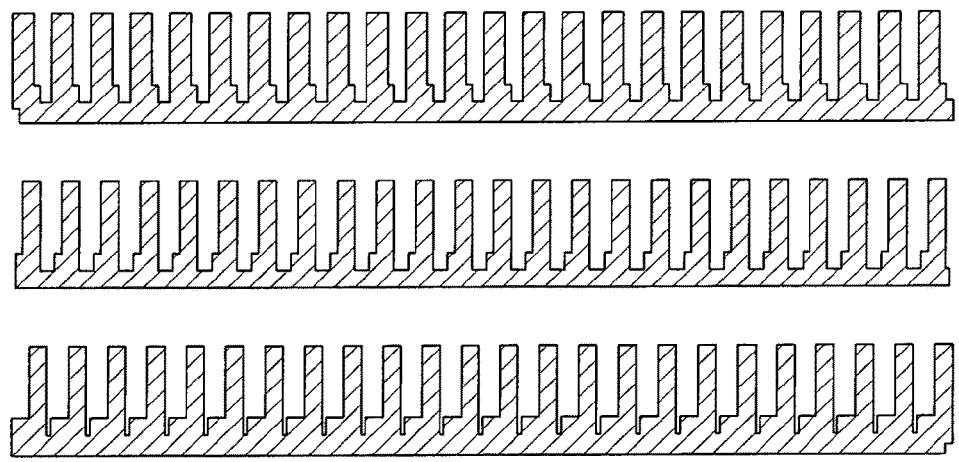
FIG. 4 illustrates the shape of the grooves of an equivalent diffractive structure changes with the displacement of the second surface relative to the first surface.

Several signals with arbitrary phase offsets relative to each others can be generated by several pairs of diffractive patterns located on the same two surfaces, but where the top and bottom patterns of each pair of diffractive pattern are laterally offset by a distance giving the desired phase offset. FIG. 3 illustrates such a system where the grating lines of the top diffractive pattern may be placed on a transparent substrate for the sake of mechanical integrity, not shown in this figure and a second surface with a second, bottom pattern is positioned under it, the latter being able to move in the lateral direction. FIG. 4 illustrates the shape of the grooves of an equivalent diffractive structure changes with the displacement of the second surface relative to the first surface.

Figure 5:
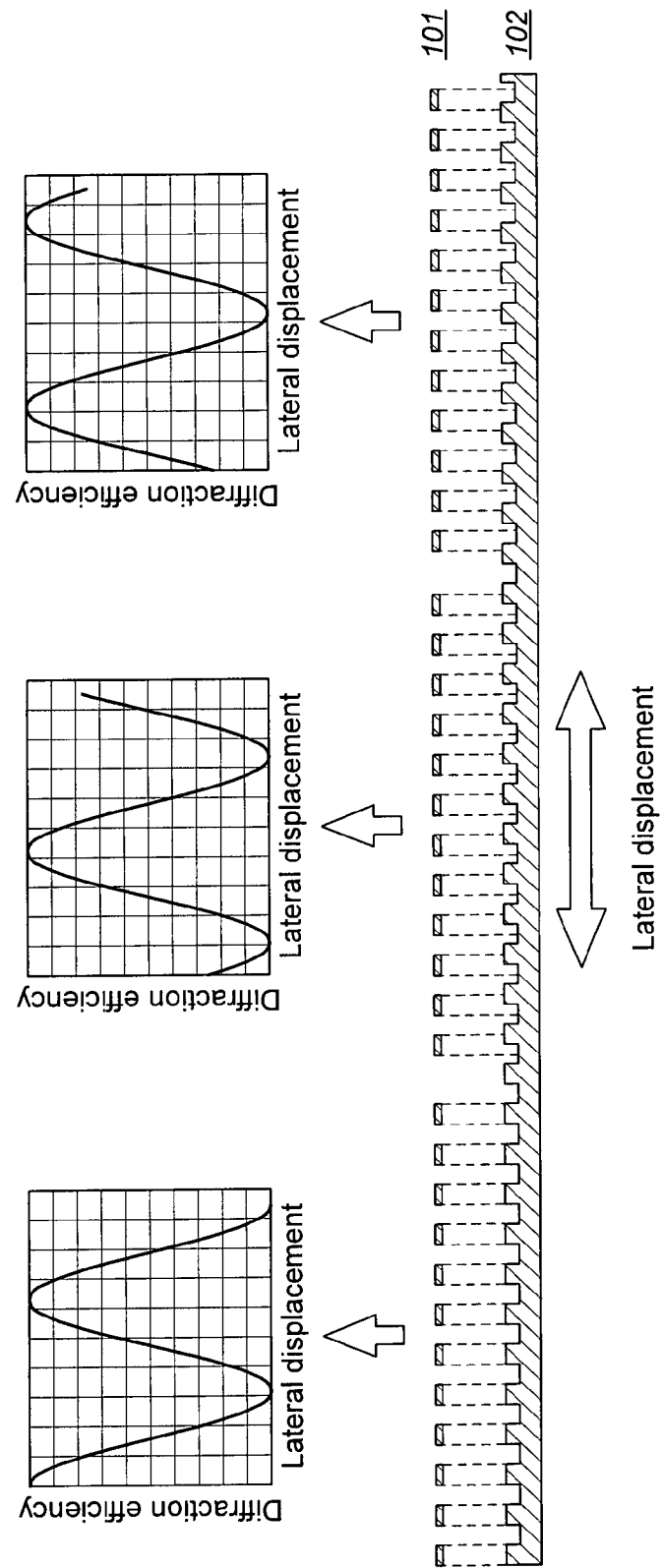
FIG. 5 illustrates several pairs of diffractive patterns giving several signals.
Figure 6:
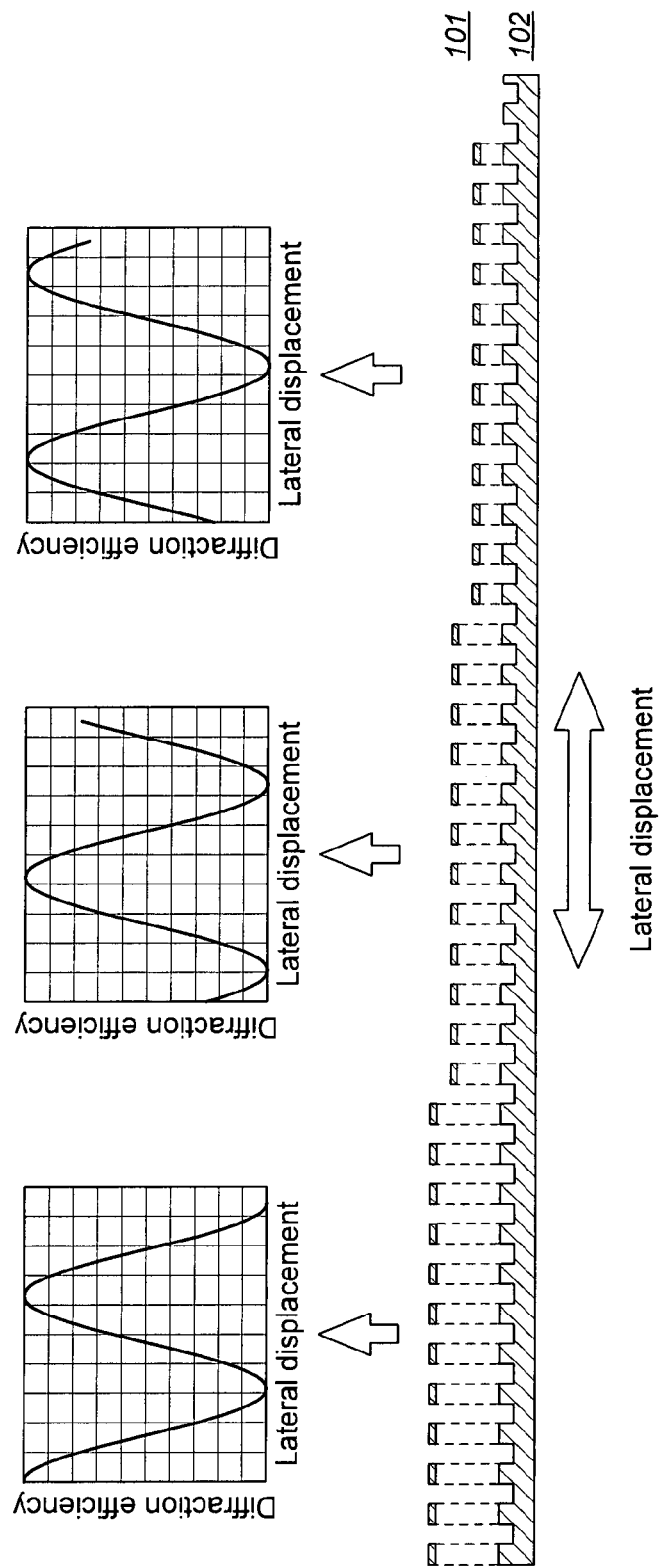
FIG. 6 Illustrates that several pairs of diffractive patterns give several signals.

Having several signals with phase appropriate offsets can allow reconstruction of the lateral displacement over several periods of the sine signals generated by each pair of diffractive patterns, for example with two signals in quadrature [6]. Three signals with 0, 120 and 240° phase offset allows measurement if the lateral displacement over several periods, as well as the cancellation of variations in illumination intensity [7, 8]. This is illustrated in FIG. 5, where several pairs of diffractive patterns give several signals. By modifying the lateral offset between the top and bottom patterns, it is possible to generate several phase-shifted signals Another alternative is shown in FIG. 6, where several pairs of diffractive patterns give several signals. By modifying the height between the top and bottom patterns, it is possible to generate several phase-shifted signals. Here the different heights are achieved by introducing a vertical offset in the location of the top diffractive patterns. But these vertical offset can also be implemented in the bottom diffractive patterns.

Figure 7:
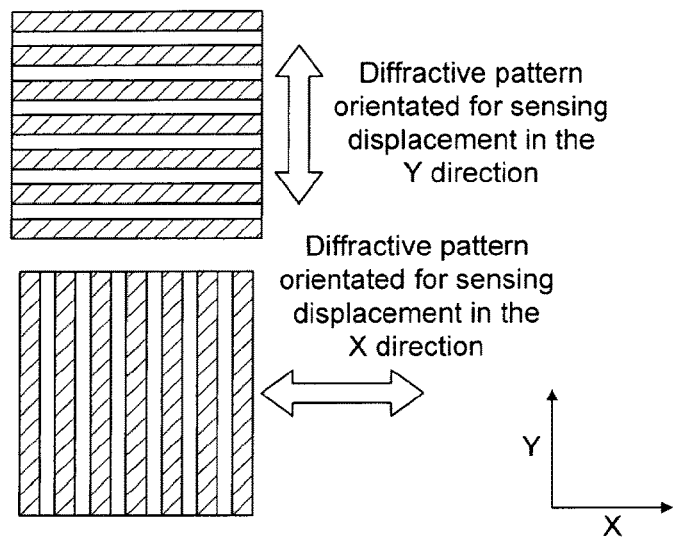
FIG. 7 Illustrates two pairs of diffractive patterns with orthogonal orientations, in order to sense displacement in both in-plane directions.

Two sets of diffractive pattern pairs with orthogonal orientation can be used in order to measure displacement in the two directions in-plane with the surfaces. An example is shown in FIG. 7. The two sets can be placed on the same top and bottom surfaces, thus providing measurement of the displacement in two directions. The two sets can also be placed on two independently moving surfaces, thus providing a measurement of the displacement of the first surface pairs in one direction, and of the second surface pairs in the orthogonal direction.

Adding a measurement of the displacement in the direction perpendicular with the surfaces can be achieved, by using a set of diffractive patterns sensitive to vertical displacement, such as [5] or [6], thus providing three-axis position measurement of the same surface pair, or of independently moving surface pairs, integrated in the same MEMS device.

When using several pairs of diffractive patterns or several sets of pairs, it is possible to use a common light source for illumination. It is also possible to use one or several optical fibers for collection of the optical signals. The system can be designed so that the diffractive patterns send signals with different wavelengths to a common optical fiber, which then allows separation of these optical signals.

Figure 8:
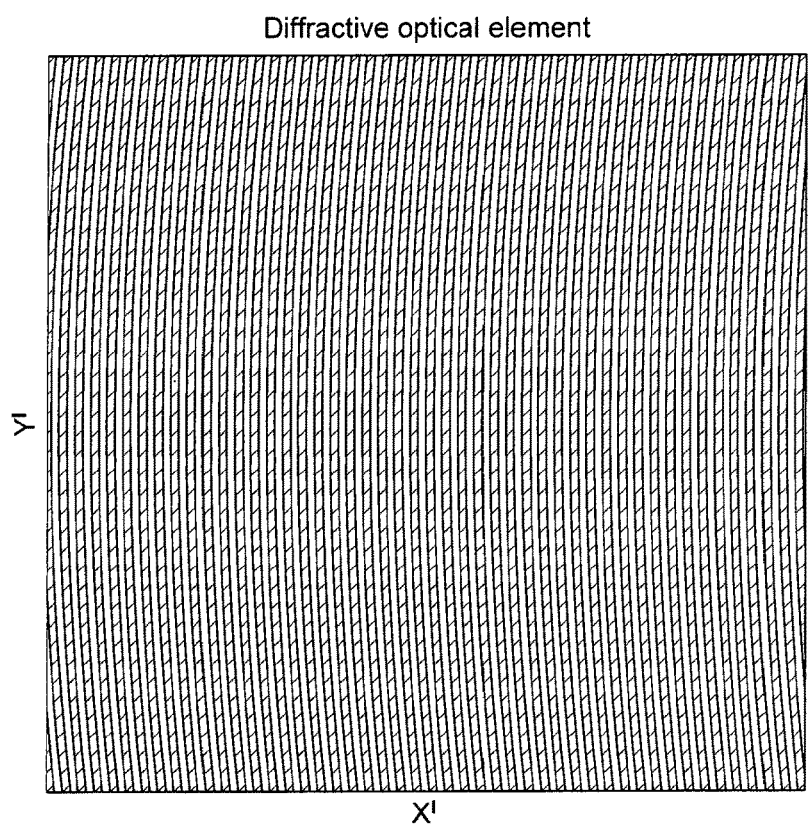
FIG. 8 illustrates an off-axis part of a lens can be used as the one of the diffractive patterns.

Another alternative is illustrated in FIG. 8, where one of the diffractive patterns is constituted by an off-axis pan of a lens. This will allow us to focus and direct the light toward a detector. In general, this principle allow us to focus and direct light from diffractive patterns with different functions toward their respective detectors, i.e. allowing phase shifted signals to be detected and demodulated. The disadvantage is that the period of the binary lens is changing over the region of interest, so only a displacement with a limited number of periods can be allowed. At a displacement of too many periods, the diffractive modulation efficiency will be reduced.

Figure 9:
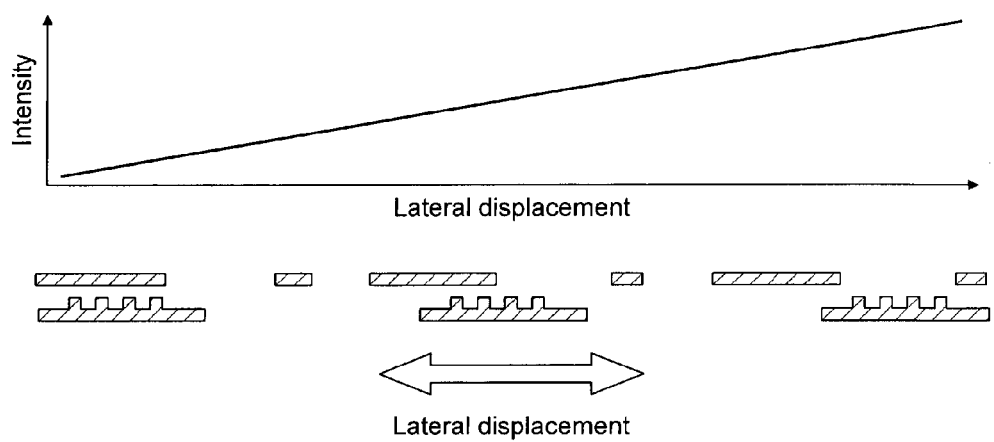
FIG. 9 illustrates an embodiment of the invention comprising an aperture over said second gratings.

The readout method is very well suited for use in accelerometers, geophones and gyros. When used as an accelerometer or a geophone, the orientation of the sensor may be important. In seismic survey the geophone or accelerometer may be placed in a gimbal system, enabling the sensor to align with the gravity field. Such a gimbal system may add complexity and increase the likelihood for failure and a solution where the sensor itself is able to tell the orientation would be preferred. In FIG. 9 we have illustrated one possible solution. By placing an aperture in front of a moving grating, it is possible to measure the orientation of the sensor, i.e. the intensity may go front 0 to max when the orientation of one of the axes of an accelerometer or a geophone changes from −g to g. The signal from the orientation sensor may be directed towards a dedicated detector, or the aperture may be combined with the lateral displacement sensor. The last solution reduces the number of detectors (or sources) needed, but the combination of the sensors will make the demodulation more complex.

In the following FIGS. 10 to 19 different structures will be carrying the moveable pattern. The static pattern may be mounted in a housing relative to this as an upper or lower part.

Figure 10:
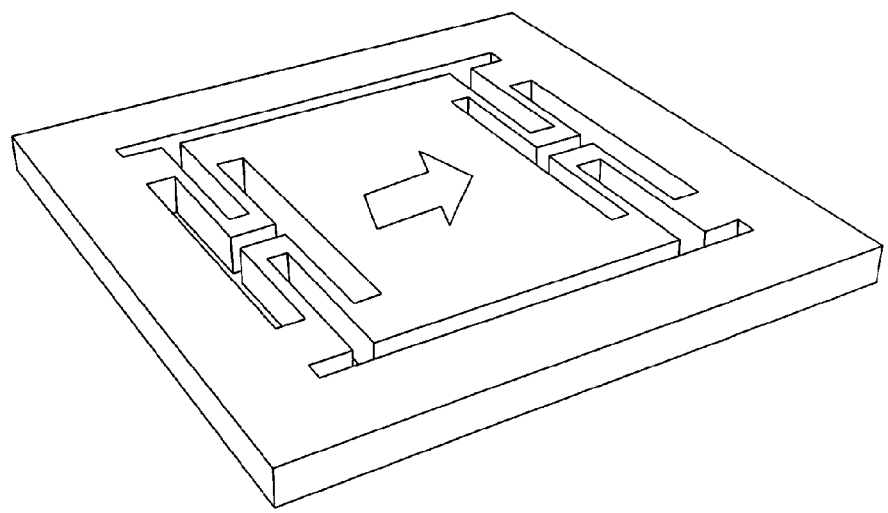
FIG. 10 illustrates a mechanical structure for carrying a diffractive pattern mainly allowing movement in one in-plane direction, as indicated with the arrow.

FIG. 10 illustrates a mechanical structure for carrying the second diffractive pattern according to the invention mainly allowing movement in one in-plane direction, as indicated with the arrow. The springs are ticker in the vertical direction, making the structure less sensitive to accelerations or vibrations in the vertical direction. The springs are most flexible in the direction indicated by the arrow.

Figure 11:
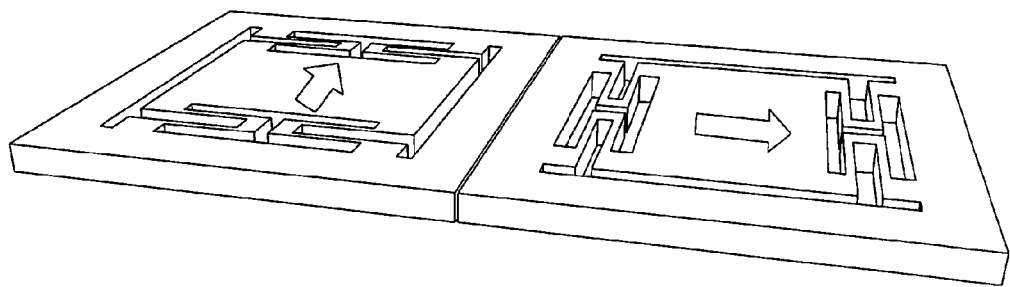
FIG. 11 illustrates two structures as illustrated in FIG. 10, being positioned with perpendicular orientations.

So far we have been discussing accelerometers with a mass moving in the plane as illustrated in FIG. 11, where the second, bottom grating of each device according to the invention is position on or in relation to two structures as illustrated in FIG. 10 being most sensitive in the x and y-direction. Two mechanical structures placed side by side, where one structure is more sensitive to in-plane acceleration in one direction (i.e. x), while the other structure is more sensitive to another direction (i.e. y), preferably orthogonal to the first. In addition we would like to integrate the z-axis as well on the same sensor device, preferably onto the some silicon wafer as the other two directions.

Figure 12:
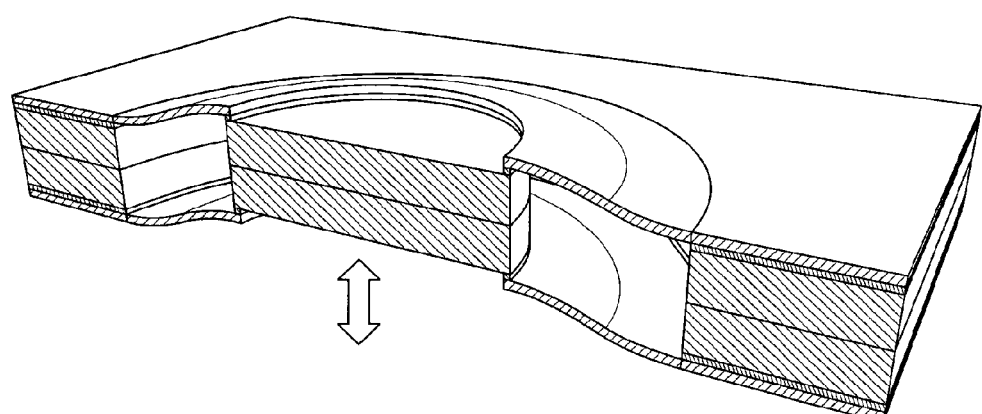
FIG. 12 illustrates a structure for carrying the second diffractive patterns in a device having a sensitivity perpendicular to the plane.

This is illustrated in FIG. 12: Cross-section of a mechanical structure most sensitive to the accelerations in the vertical directions (out of plane movement) where the corresponding second, bottom diffractive grating is positioned on or in relation to the moving mass. The structure has springs both on the top and on the bottom, making the structure less sensitive to in-plane movement. Here, the springs are shown as the entire membrane, but the springs may of course be only 3 or 4 beams in the radial direction, or other configurations suppressing movement in-plane.

Figure 13:
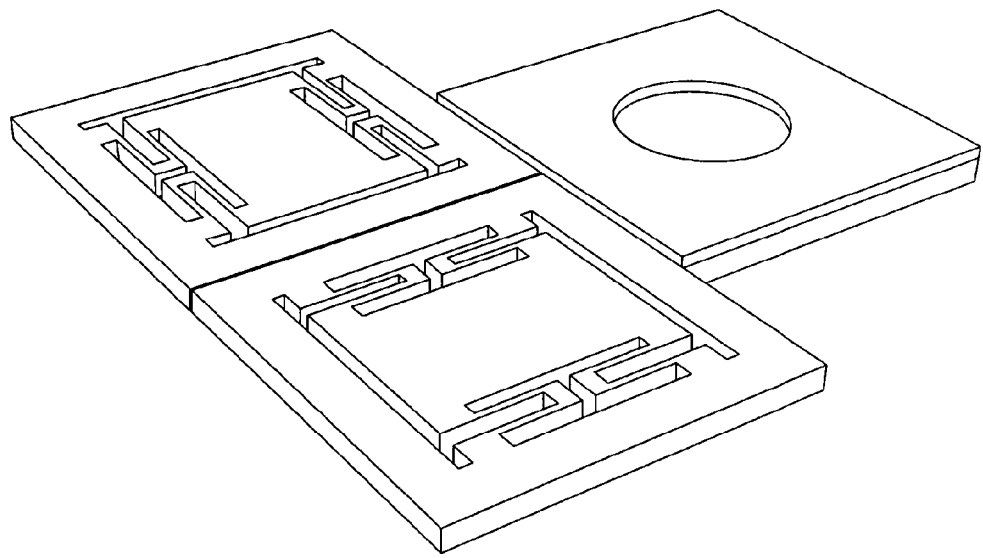
FIGS. 13,14 illustrates top and bottom views of three structures having perpendicular directions of sensitivity.
Figure 14:
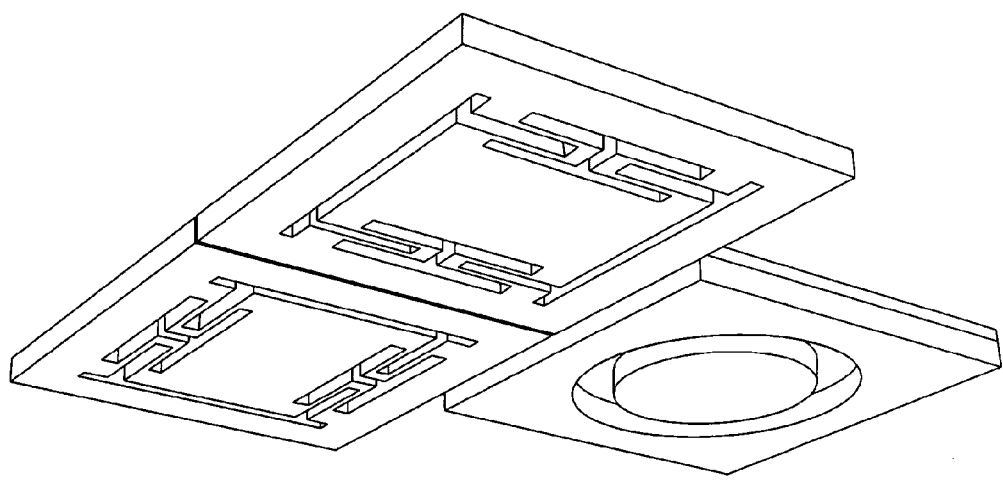

FIGS. 13 and 14 show top and bottom views of mechanical structures for measuring the in-plane movements in two direction in the plane, and one for measuring out of plane movements (acceleration). The advantage with this is that it is possible to produce the mechanical and optical parts on the same wafer with precision lithography and reactive ion etching (RIE) on i.e. a silicon wafer, align this wafer with the top wafer with diffractive optics and bond these together, and then bond a last wafer with the electronics, lasers and detectors on top, and finally dice the wafers into several 100 fully aligned sensors with optics and electronics integrated. This kind of wafer level assembly allow for low cost in high volume production.

Figure 15:
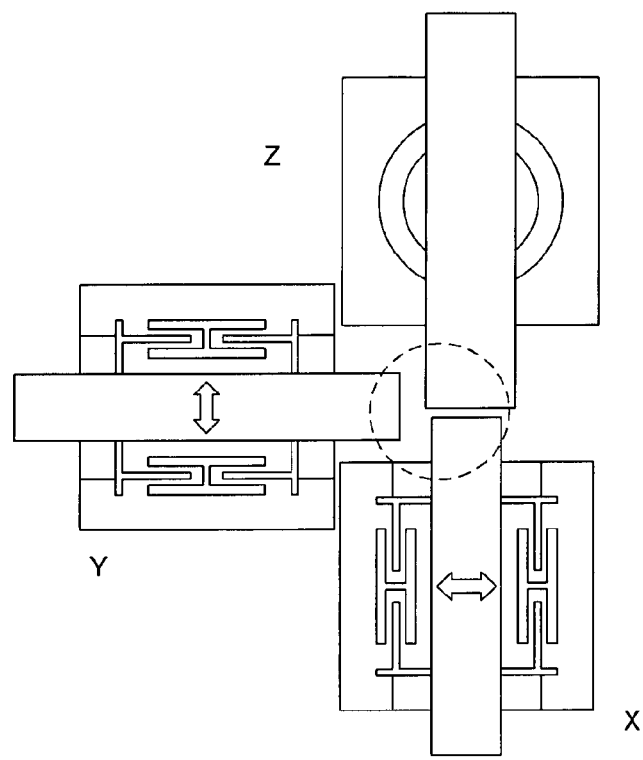
FIGS. 15,16 illustrates an embodiment three perpendicularly oriented devices with grating carrying beams.
Figure 16:
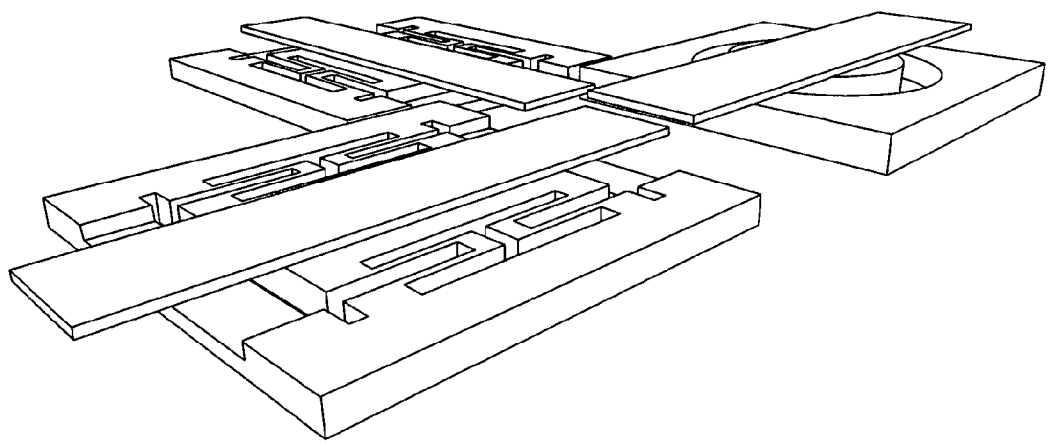

FIGS. 15 and 16 illustrates a structure with mechanical extensions. The second gratings are positioned closed to each others at the ends of the three different extensions, allowing the mechanical movements of the three sensors to be measured in the same area, as indicated with the dotted circle. This allows the use of a single light source (i.e. a VCSEL), if low power consumption is required.

Figure 17:
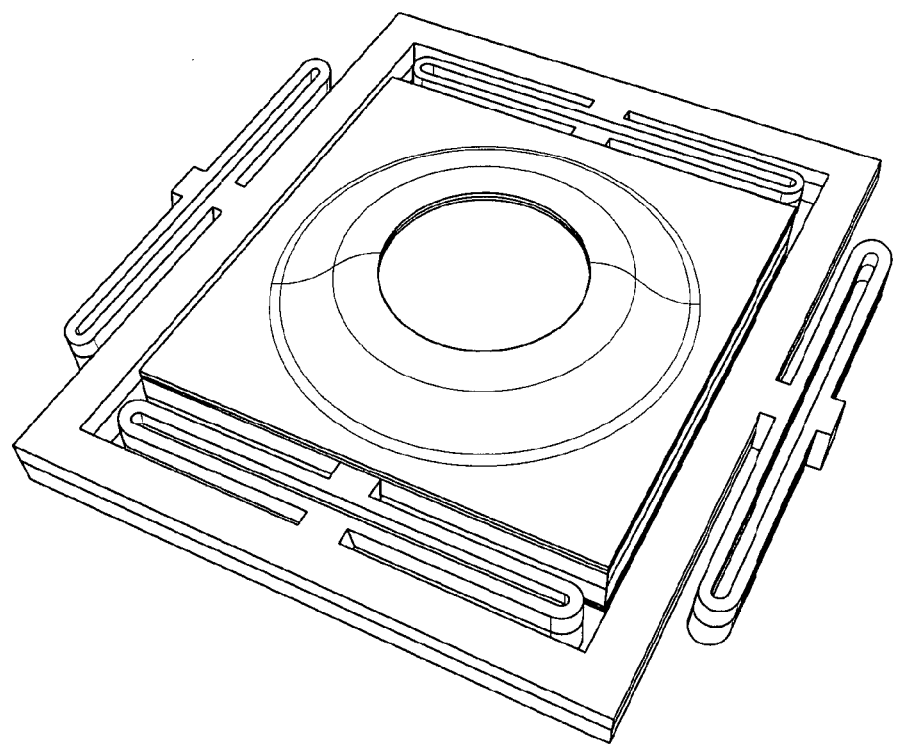
FIGS. 17,18 illustrates an embodiment allowing movement in all three directions, but with only one mass, and with individual springs for each direction
Figure 18:
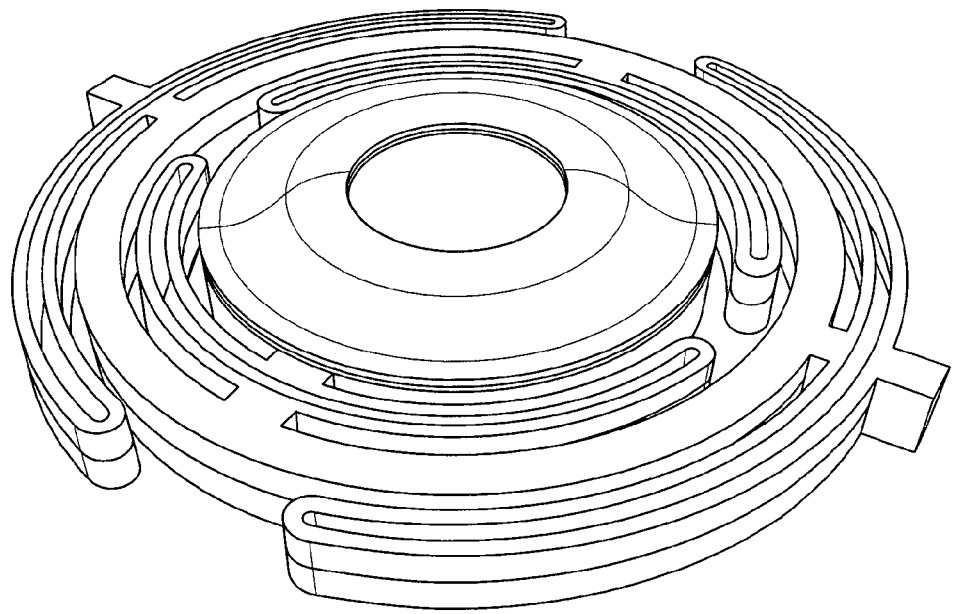

FIGS. 17 and 18 show a mechanical structure that allows movement in all three directions. The center structure move up and down, and the two structures outside allows movement in the two orthogonal in-plane directions. The movement of all three directions can be measured by gratings placed in the center, or axis can be separated by placing the gratings in one of the corners, in such a way that some of the grating structures are placed on the outer frame, others are place on the inner frame, and the last direction is placed on the center mass (and maybe with a mechanical extension structure).

Figure 19:
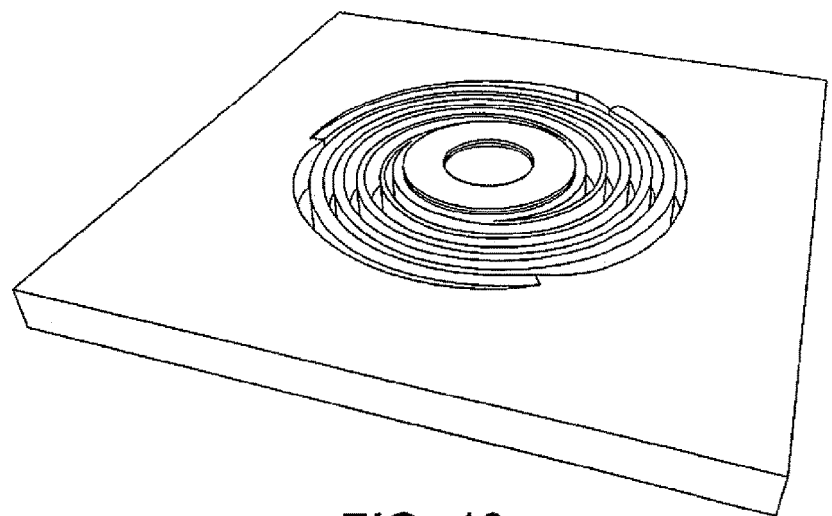
FIG. 19 illustrates an embodiment allowing movement in all three directions, using the same spring
Figure 20:
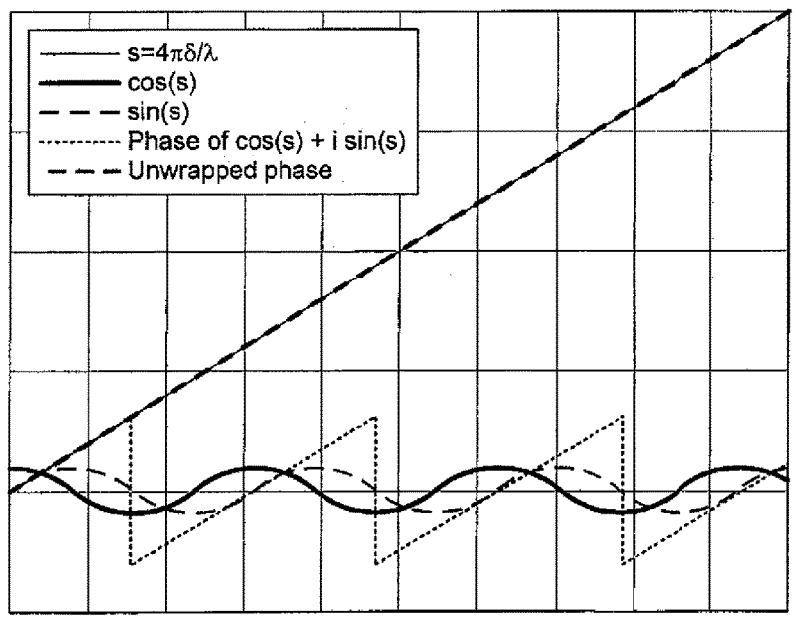
FIG. 20 illustrates measurements according to the prior art.

FIG. 19 shows another mechanical structure that allow movement in all three directions. This structure differs from the previous, since this structure allows movement in all in-plane directions. The out of plane direction may be dimensioned by the thickness and length of the spiral springs, the center structure may have a membrane spring allowing out of plane movement.

This present it described as an extension to the use of several diffractive elements with several heights relative to a reflecting surface. The diffractive elements may be placed under the same reflecting surface and in one embodiment their height relative to the reflecting surface must at all time differ only by a height offset which is nearly constant (this nearly constant height offset is different for each diffractive element). In another embodiment, the heights relative to the reflecting surface changes for all the structures, but the some of the diffractive structures are used to measure the height, and this height is corrected for during the reconstruction of the lateral displacements. The reflection or/and diffraction from the different diffractive elements is directed onto several detectors and generates signals with phase differences.

The principle may thus be described as follows

If each diffractive element directs light onto its own detector, giving an electric signal $$A_n \approx I\left(1 + \cos\left(\frac{4\pi}{\lambda}\delta + \varphi_n\right)\right),$$

with a phase offset $$\varphi_n = \frac{4\pi}{\lambda} d_n,$$

and where I is the illumination intensity, $\lambda$ the wavelength of the illumination, $d_n$ the height (distance) of each diffractive element relative to the reflecting, surface when at its idle position and $\delta$ is the displacement of the reflecting surface relative to its idle position. Further information about how the signal A is generated can be found in US2005/0018541.

The principle is thus to read several signals with different phase offsets and we call this method multiple phase readout, in special cases the method can be called differential readout (when taking the difference of two signals, typically with a 180° phase difference) or quadratic readout (when using two signals with a 90° phase difference).

The principle of combining several sinusoidal signals out of phase in order to make a measurement and more or less directly to increase the dynamic range—has already been implemented in several devices, for example in optical position sensors EP2482040, US2005/0253052 and WO 2002/04895. Other applications might be interferometric distance measurement and TV-holography (a quick patent search did not return relevant results on these last applications). We want to restrict this invention to position sensors with a diffractive readout, i.e. when using a diffraction grating or a focusing diffractive lens.

In US2005/0018541 the implementation is described of a "differential microphone" where two diffractive elements with two different heights relatively to the reflecting surface give two signals A1 and A2 with as phase difference of 180°, as illustrated in FIG. 9 in the publication.

We then have $$\begin{cases} A_1 = I\left(1 + \cos\left(\frac{4\pi}{\lambda}\delta\right)\right) \\ A_2 = I\left(1 + \cos\left(\frac{4\pi}{\lambda}\delta + \pi\right)\right) = I\left(1 - \cos\left(\frac{4\pi}{\lambda}\delta\right)\right) \end{cases}.$$

It is possible to cancel the fluctuations in the illumination I by combining $A_1$ and $A_2$, and retrieving directly the displacement of the reflecting surface:

$$\delta = \frac{\lambda}{4\pi}\cos^{-1}\left(\frac{A_1 - A_2}{A_1 + A_2}\right).$$

Cancellation of the illumination fluctuations can also be implemented by measuring the light focused (in the $-1^{st}$ diffraction order) by the diffractive element and the light reflected ($0^{th}$ diffraction order) by the diffractive element, which produce two signals with a $\pi$ phase difference. Using both the reflection and diffraction to cancel the illumination fluctuation was published in a presentation by Lacolle et al, "Micromachined Optical Microphone based on a modulated diffractive lens", $3^{rd}$ of the EOS Topical Meeting on Optical Microsystems (OµS'09), Capri., Sep. 27-30, 2009. Patent applications by Hall et al US2011/0194857 and US2011/0194711 discuss the principle applied to a linear grating without focusing capabilities.

To achieve highest sensitivity and a nearly linear measurement, it is important that the reflecting surface's idle position or working point is situated where the curve giving $$A = I\left(1 + \cos\left(\frac{4\pi}{\lambda}\delta + \varphi\right)\right)$$

is steepest (for high sensitivity) and most linear to avoid distortion in the measured signal. The two first suitable working points are shown in the present FIG. 2.

The curve is actually periodic with a period of $\lambda/2$ in distance or $2\pi$ in phase. Therefore, to ensure high sensitivity and good linearity, $\varphi$ must be close to $\pi/2$ plus a multiple integer of $\pi$. This means that the distance d between the diffractive element and the reflecting surface at its idle position must satisfy $$d = \frac{\lambda}{8} + m\frac{\lambda}{4}, \text{ with } m = 1, 2, 3 \ldots$$

Therefore, the distance d must be very accurately defined. However, in a physical implementation, it is possible that the height of the diffractive element relative to the reflecting surface at its idle position changes due to thermal stability of the device, combined with the fact that it could be very difficult to manufacture a device with a very accurate height in the first place. In this case we have a perturbation in the heights of the diffractive elements $d_{perturbation}$, which may or may not vary in time but which is the same for all diffractive elements.

In US2004/0130728 and US2005/0192976 a solution is proposed where the reflective surface is displaced by electrostatic actuation to a proper working point. This system requires an active feedback system.

Multiphase out can also be use as a remedy to this problem. We can for example fabricate a device with N diffractive elements where the height of the nth diffractive element is given by $$d_n = \frac{\lambda}{8} + m\frac{\lambda}{4} + n\frac{\lambda}{4N} + d_{perturbation},$$

in which case we are sure that there is a diffractive element satisfying $$\left|d_n - \frac{\lambda}{8} - m\frac{\lambda}{4}\right| \leq \frac{1}{2}\frac{\lambda}{4N}.$$

Choosing the diffractive element satisfying the condition above will ensure good sensitivity and linearity at all time. For example, if we have 4 diffractive elements, there will be a diffractive element with a working point that is within $\lambda/32$ of the closest ideal working point in height, or $\pi/8$ in phase.

Another new feature offered according to prior art is the possibility to increase the dynamic range of the sensor. This makes it possible to increase the dynamic range of the sensor from a $\sim\lambda/8$ motion range to several $\lambda$.

This can be achieved by the fabrication of a sensor with two diffractive elements giving two signals in quadrature:

$$\begin{cases} A_1 = I\left(1 + \cos\left(\frac{4\pi}{\lambda}\delta\right)\right) \\ A_2 = I\left(1 + \cos\left(\frac{4\pi}{\lambda}\delta - \frac{\pi}{2}\right)\right) = I\left(1 + \sin\left(\frac{4\pi}{\lambda}\delta\right)\right) \end{cases}$$

The displacement $\delta$ is retrieved by first computing the complex number $$\left(\frac{A_1}{I} - 1\right) + i\left(\frac{A_2}{I} - 1\right) = \cos\left(\frac{4\pi}{\lambda}\delta\right) + i\sin\left(\frac{4\pi}{\lambda}\delta\right),$$

And then by unwrapping the phase of this complex number $$\delta = \frac{\lambda}{4\pi}\text{Unwrap}\left[\text{Arg}\left[\left(\frac{A_1}{I} - 1\right) + i\left(\frac{A_2}{I} - 1\right)\right]\right],$$

In this case the device does not require an accurate idle position (working point) and a small height variation $d_{perturbation}$ would not degrade the sensitivity or linearity of the device. Another advantage is that there is no theoretical limitation in the amplitude of the reflecting surface displacement that can be several $\lambda$. But this method requires that the illumination intensity I is known. This can be implemented in the same device by adding diffractive elements that gives signal with a 180° phase shift.

An alternative algorithm to retrieve the position on a dynamic range of several wavelengths from 2 signals in quadrature is described in Stowe, D., and Tsang-Yuan Hsu. "Demodulation of interferometric sensors using a fiber-optic passive quadrature demodulator." Lightwave Technology, Journal of 1.3 (1983): 519-523 [3].

In an implementation with multiple phase readout with four diffractive elements may be considered. Four diffractive elements give:

$$\begin{cases} A_1 = I\left(1 + \cos\left(\frac{4\pi}{\lambda}\delta\right)\right) \\ A_2 = I\left(1 + \cos\left(\frac{4\pi}{\lambda}\delta + \frac{\pi}{2}\right)\right) = I\left(1 - \sin\left(\frac{4\pi}{\lambda}\delta\right)\right) \\ A_3 = I\left(1 + \cos\left(\frac{4\pi}{\lambda}\delta + \pi\right)\right) = I\left(1 - \cos\left(\frac{4\pi}{\lambda}\delta\right)\right) \\ A_4 = I\left(1 + \cos\left(\frac{4\pi}{\lambda}\delta + \frac{3\pi}{2}\right)\right) = I\left(1 + \sin\left(\frac{4\pi}{\lambda}\delta\right)\right) \end{cases}$$

The displacement $\delta$ is retrieved by $$\delta = \frac{\lambda}{4\pi}\text{Unwrap}\left[\text{Arg}\left[\left(\frac{A_1 - A_3}{A_1 + A_3}\right) + i\left(\frac{A_4 - A_2}{A_2 + A_4}\right)\right]\right],$$

which is independent of the illumination intensity I.

This is a combination of the principles described above which gives all the three advantages of multiple phase read out:
Cancellation of the fluctuations of the illumination
Working point adjustment
Increased dynamic range An alternative to the solution above the use of two diffractive elements gives two signals in quadrature, where both the diffracted and reflected signals from each of the two diffractive elements are measured. The diffracted and reflected signals are out of phase (with a 180° phase offset). This gives the four signals described above, with $$\varphi = 0, \frac{\pi}{2}, \pi, \frac{3\pi}{2},$$

but where I might be different for the diffracted and reflected signal, though only by a multiplicative factor, which can easily be corrected.

Both the illumination signal and the reflecting surface displacement can be retrieved by using three diffractive elements giving the signals $$\begin{cases} A_1 = I\left(1 + \cos\left(\frac{4\pi}{\lambda}\delta\right)\right) \\ A_2 = I\left(1 + \cos\left(\frac{4\pi}{\lambda}\delta - \frac{2\pi}{3}\right)\right) \\ A_3 = I\left(1 + \cos\left(\frac{4\pi}{\lambda}\delta + \frac{2\pi}{3}\right)\right) \end{cases}$$

We then compute the complex number $$S = A_1 + A_2 \exp\left(i\frac{2\pi}{3}\right) + A_3 \exp\left(-i\frac{2\pi}{3}\right).$$

After development we find $$S = I\frac{3}{2}\left[\cos\left(\frac{4\pi}{\lambda}\delta\right) + i\sin\left(\frac{4\pi}{\lambda}\delta\right)\right].$$

The signal illumination can easily be retrieved by computing the modulus of S:

$$I = \frac{2}{3}\text{Abs}(S),$$

And the reflective surface displacement can be retrieved by computing and unwrapping the phase of S:

$$\delta = \frac{\lambda}{4\pi}\text{Unwrap}[\text{Arg}(S)].$$

This also gives all three advantages of multiple phase readout:

Cancellation of the fluctuations of the illumination

Working point adjustment

Increased dynamic range

An alternative algorithm to retrieve the position on a dynamic range of several wavelengths from for 3 signals with 0, 120° and 240° phase shift is described in articles by Brown, David A., et al. "A symmetric 3×3 coupler based demodulator for fiber optic interferometric sensors." *SPIE. Fiber Optic and Laser Sensors IX* Vol. 1584 (1991) [1] and Reid, Greg J., and David A. Brown. "Multiplex architecture for 3×3 coupler based fiber optic sensors." *SPIE, Distributed and Multiplexed Fiber Optic Sensors RI*, Boston (1993) [2].

In a more general way three or more appropriate signals may be used where it is possible to retrieve I with:

$$I = \Sigma \alpha_i A_i$$

And retrieve the displacement with $$\delta = \frac{\lambda}{4\pi}\text{Unwrap}\left[\text{Arg}\left[\sum \beta_i\left(\frac{A_1}{I} - 1\right)\right]\right],$$

where $\alpha_i$ are real constants and $\beta_i$ are complex constants.

Adding more signals adds redundancy to the measurement and might reduce measurement errors.

Figure 21:
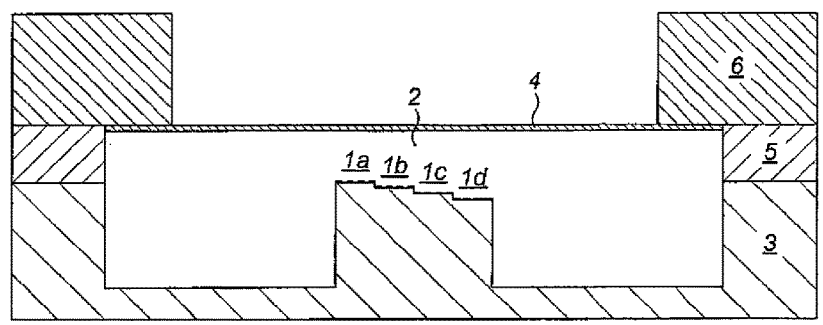
FIG. 21 illustrates the prior art including a position sensor with multiple phase readout and here four diffractive elements.

A displacement sensor with multiple phase readmit is shown in FIG. 21. The sensor in FIG. 21 may corresponds to measurements in the vertical direction but as indicated in relation to FIG. 6 the different levels may also apply to lateral movements, or combinations of movements as illustrated in FIGS. 13-16 but especially in FIGS. 17-19 where all diffractive patterns may be applied on the same surface, in which several, levels or patterns for each sensitivity direction may be used knot shown in the drawings).

The device consists of a surface (2) which is at least partially reflective, and might be the side of a membrane (4), and several diffractive elements (1*a-d*). The surface (2) and the diffractive elements (1*a-d*) are separated by a cavity defined by a spacer (5). In this embodiment there is a frame (6) supporting the membrane (4). The diffractive elements (1*a-d*) are supported by an at least partially transparent substrate (3). There can be 2 or more diffractive elements (on the figure there are 4). Different heights between (1*a-d*) and (2) are implemented by creating recesses in the substrate (3), where the diffractive elements (1*a-d*) are situated.

The diffractive elements (1*a-d*) are placed under the same reflecting surface (2) and their heights relative to the reflecting surface must at all time differ only by a height offset which is nearly constant (this nearly constant height offset is different for each diffractive element). This can be implemented as:

1. focusing diffractive lenses, such as in US2005/0018541, in which case the diffractive lenses have different optical axis, so that they each locus the diffracted spot at different locations where the detectors can be situated,
2. non-focusing gratings such as in US2004/0139728 and US2006/0192976, in which case the diffraction from each grating element are split by the fact that the grating element are not situated at the same place, or/and have different orientation of the grating lines. It may also be possible to use additional lenses for focusing of the diffracted or reflected light onto several detectors.

Figure 23:
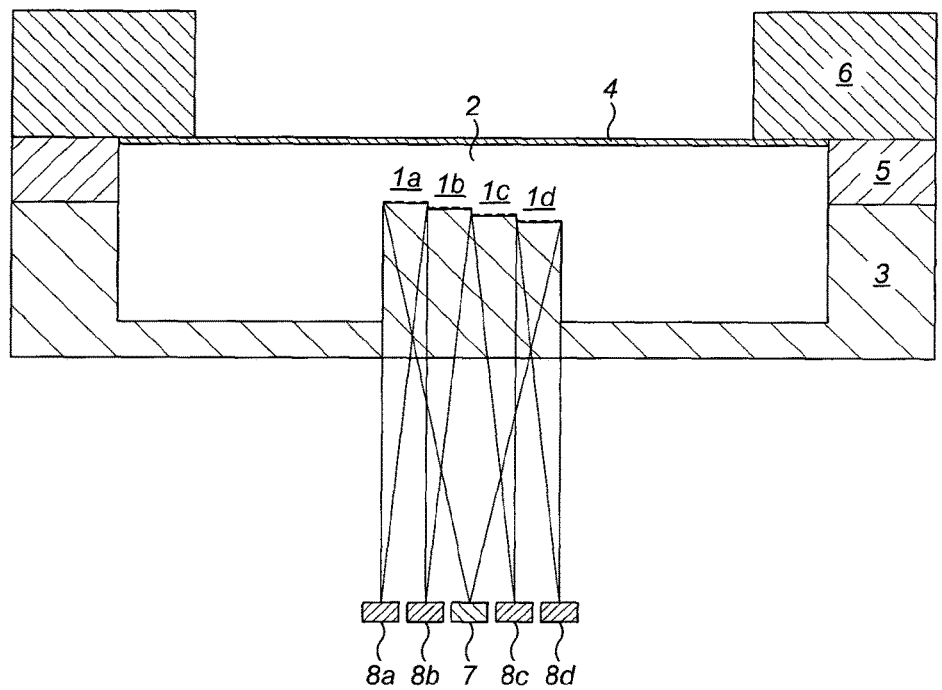
FIG. 23-31 illustrates embodiments of the solution in FIG. 21.

The readout principle is the following: when the distance between the diffractive elements (1*a-d*) and the reflective surface (2) changes, the diffraction efficiency of the diffractive elements (1*a-d*) is modulated. Modulated signals can be generated by illuminating the device with a narrow-band light source (7), a VCSEL for example (see FIG. 23). Several photodetectors (8*a-d*) then measures the light reflected or diffracted by the diffractive elements. The signals have a similar dependence on the distance between the diffractive elements (1*a-d*) and the reflecting surface (2), but with a phase/height offset (an offset relative to the distance between the diffractive elements (1*a-d*) and the reflective surface (2)).

Figure 22:
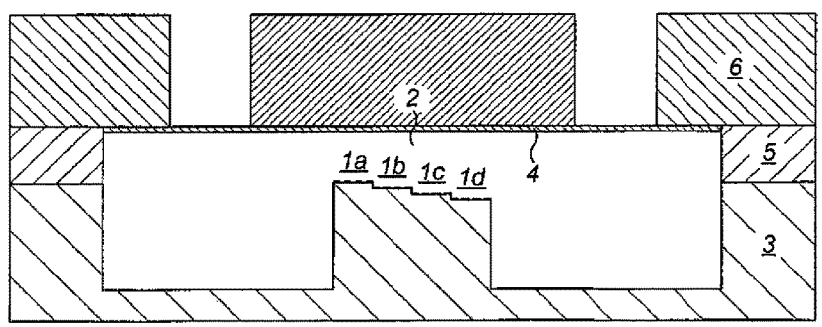
FIG. 22 illustrates the solution in FIG. 21 with an added mass for vibration and acceleration measurements.

By adding a mass to the membrane as illustrated in FIG. 22, the sensor becomes sensitive to vibrations and accelerations.

The electric signals from the photodetectors are processed, so that the distance between the diffractive elements (1*a-d*) and the reflecting surface (2) is retrieved, on a dynamic range of several wavelengths. To achieve that, there must be two or more diffractive elements with to height offset.

Figure 24:
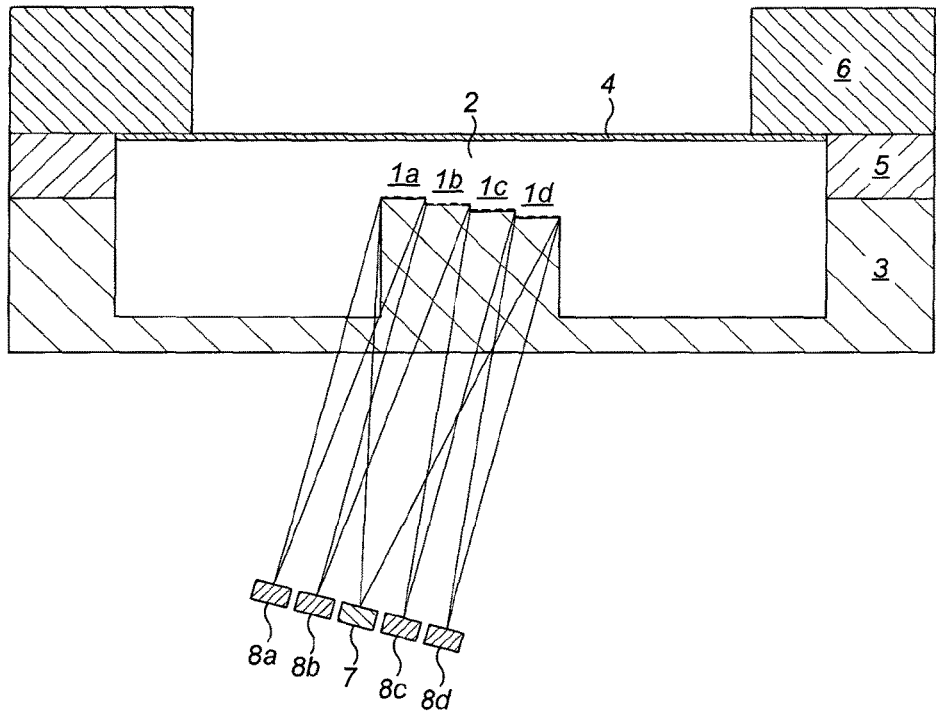

A device similar to the one described above is shown in FIG. 24, were the light source is tilted compared to the plane of the diffractive elements (1*a-d*) and of the reflecting surface (2), in order to reduce the amount of light reflected back to the light source. Light reflected back into a laser diode will typically increase the source noise.

As mentioned above, the heights of the diffractive elements relative to the reflecting surface must at all time differ only by a constant that is inherent to each diffractive element. In practice, this can be achieved by placing the diffractive elements close to each other, under the reflective surface. In the case of a bending membrane, an appropriate location would be the centre of the membrane where its curvature is minimal. In FIGS. 21 and 22, the diffractive elements are shown side by side, but the diffractive elements can rather be placed in a circular area under the reflecting surface. Two examples with three diffractive elements are shown in FIG. 25 and FIG. 26.

In FIG. 25a-c an Off-axis embodiment is shown with three different diffractive elements placed in a circular area under the reflecting surface. The position of the three different diffractive elements 11,12,13 is shown in FIG. 25a. In FIG. 25b shows an embodiment with focusing diffractive elements with centres 21,22,23, whose reflecting lines are shown. FIG. 25c shows, in addition, the position 10 of a light source for illumination of the diffractive elements, as well as the positions 31,32,33 of three detectors measuring light diffracted and focused by the three diffractive elements. The light source and the three detectors are placed in a plane situated under the diffractive elements, and the relative positions are chosen depending on the reflective characteristics of the lenses as well as their mutual positions.

The distribution of the three lenses over the circular area is chosen so as to provide essentially equal efficiency in reflections from all three diffractive elements.

Figure 25:
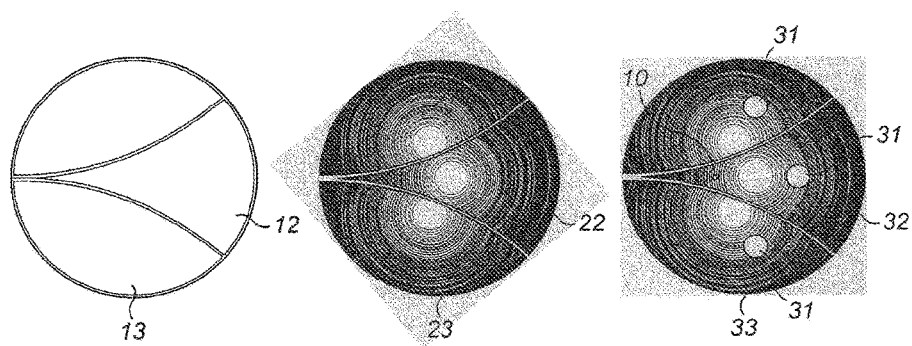
Figure 26:
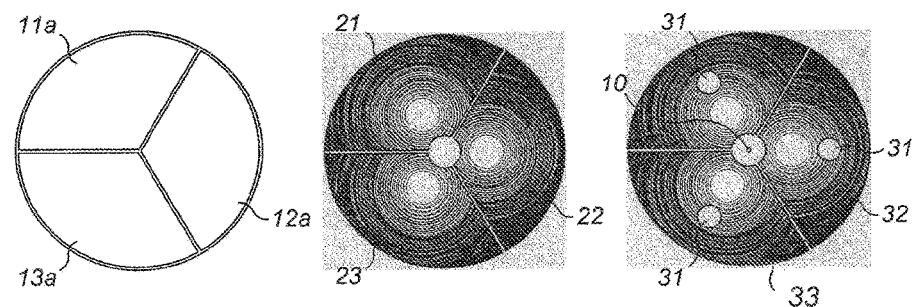

FIG. 26 illustrates an On-axis embodiment similar to that shown in FIG. 25, but where the light source is placed in the centre and thus with three equally sized circle sections 11a,12a, 13a each provided with diffractive elements. In the case of the use of focusing diffractive elements, it can be useful to make the centre areas 21,22,23 of the diffractive elements opaque 24, so that no light is reflected onto the detectors which in this case measure the diffracted and focused light. This can also be achieved by etching a curved surface 25 onto the substrate where the central part of each diffractive element is situated. In a similar way, it can be useful to make the area above the light source opaque or etched 20, in order to minimize the amount of light reflected back to the light source. This is shown in FIG. 27 and FIG. 28.

Figure 27:
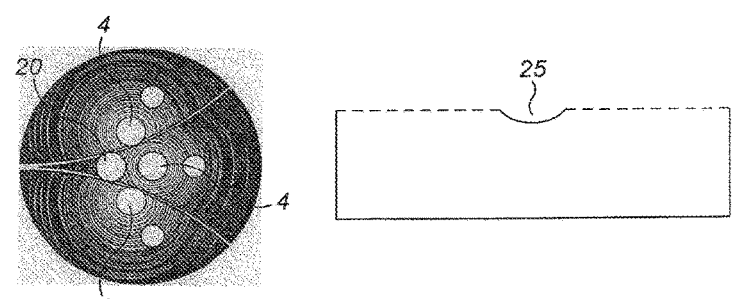

FIG. 27: Illustration of how the centre area of a focusing diffractive element can be made opaque or curved so that no light is reflected into the $0^{th}$ diffraction order from the centre area of the diffractive elements onto the detectors measuring the diffracted and focused light.

Figure 28:
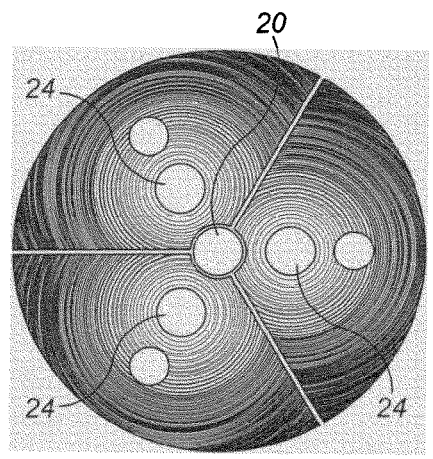

FIG. 28: Similar implementation as FIG. 27, but in an on-axis implementation.

Figure 29:
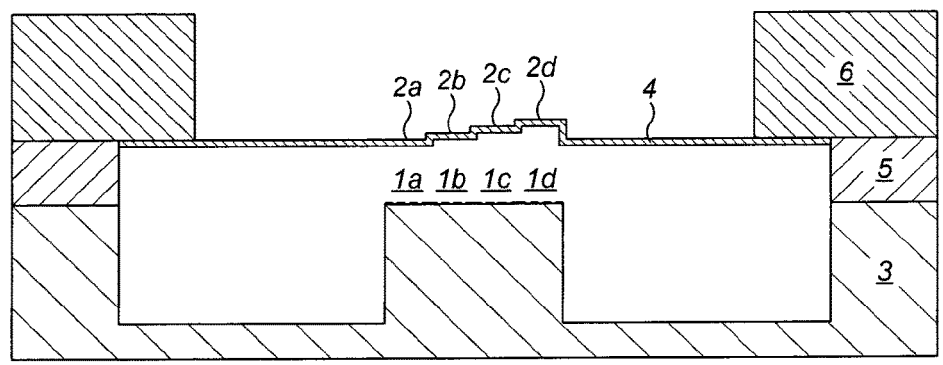

Embodiment with recesses onto the reflecting surface. An alternative embodiment is to place the diffractive elements (1a-d) in plane and to implement the recesses (2a-d) in the reflecting surface, as shown in FIG. 29. There can be two or more diffractive elements.

Figure 30:
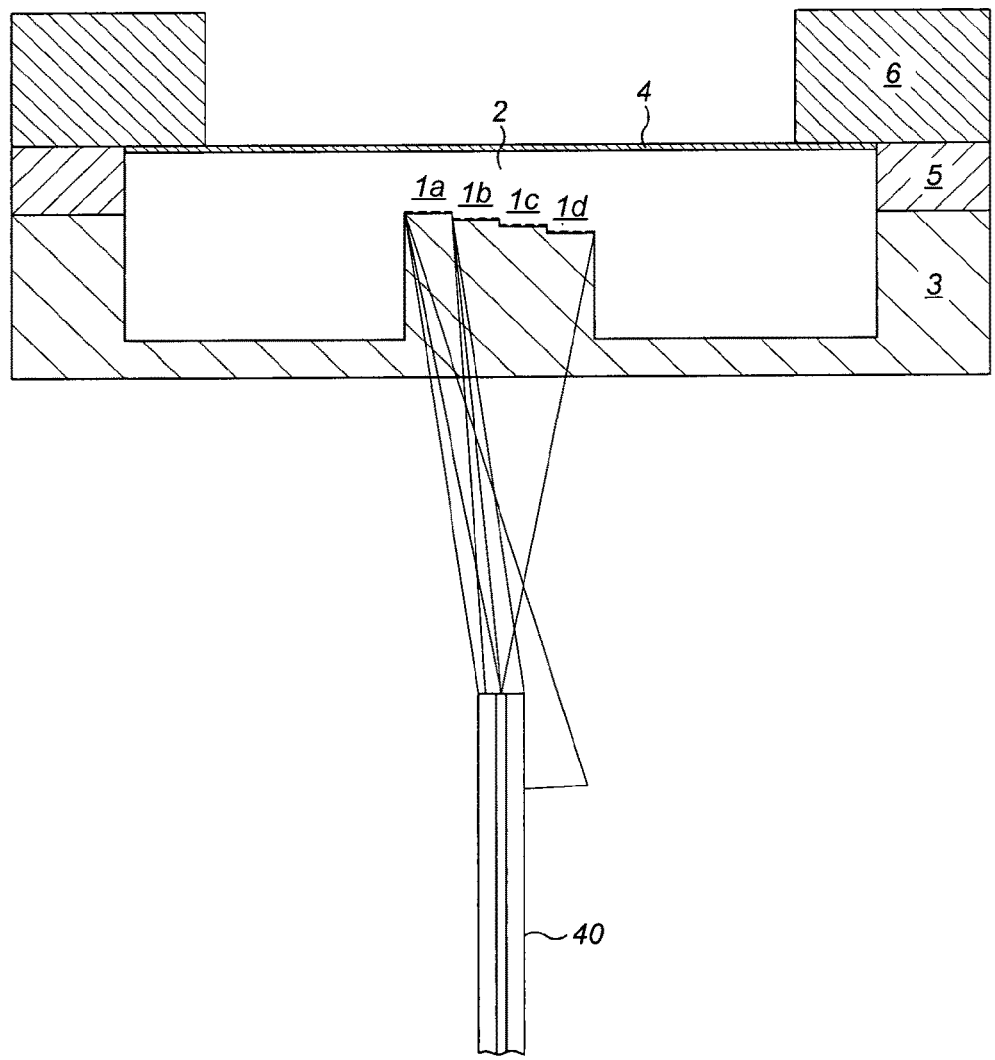
Figure 31:
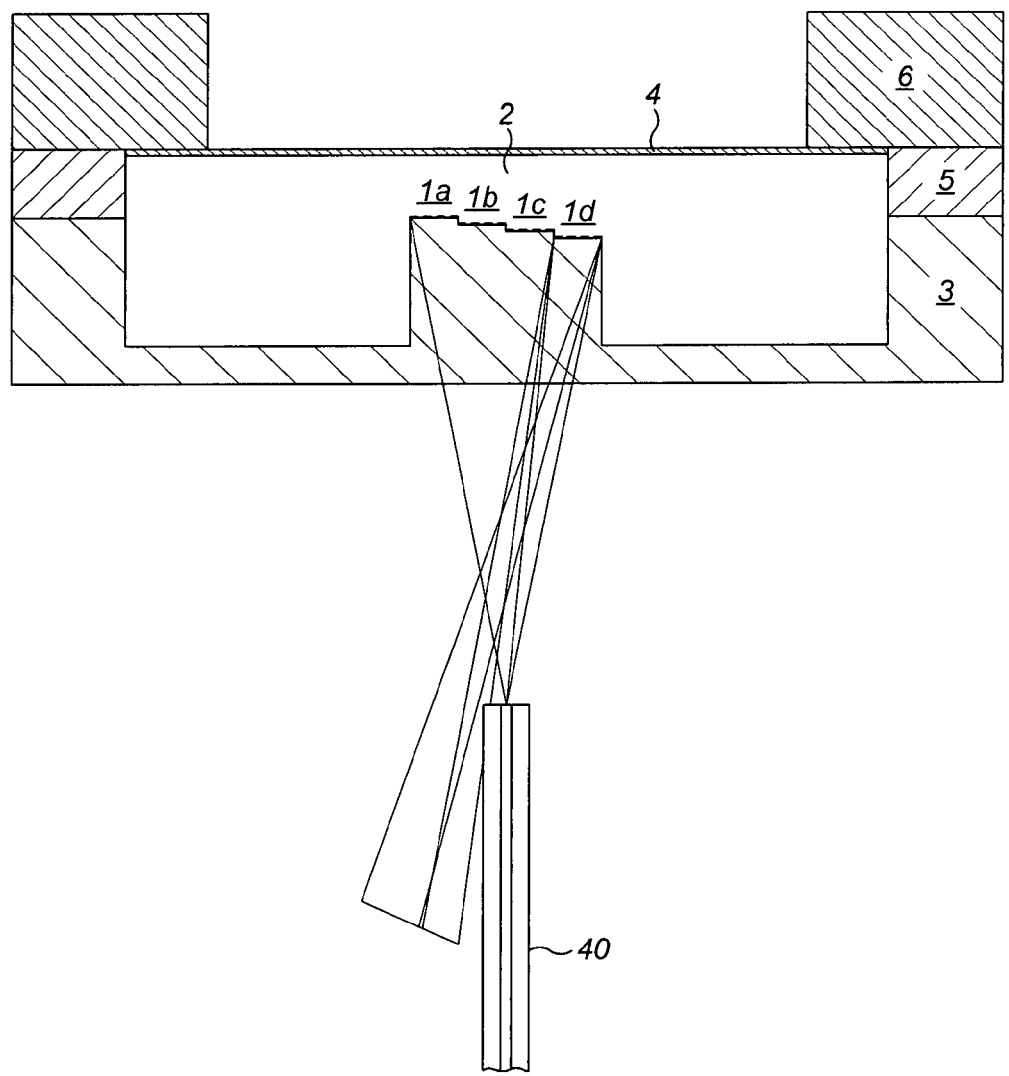

In FIGS. 30 and 31 the light source and detectors are provided through an optical fibre 40 which, in a per se known way transmits light toward the diffractive elements 1(a-d). This light may have a chosen spectral range and the diffractive elements may be provided with focusing characteristics so as to focus light back toward the optical fibre so that the wavelength of the light received by the optical fibre indicates the identity of the focusing diffractive element. As the characteristics of the diffractive elements are known, the position of the diffractive elements relative to the reflective surface 2 is known and the relative displacement may be found. This is shown in FIGS. 30-31 as the first diffractive element 1a focuses toward the fibre end in FIG. 30, while the fourth diffractive element focuses toward the fiber end in FIG. 31.

To summarize the invention thus relates to an optical displacement sensor device comprising a first at least partially transparent plane surface with a first diffraction pattern. The transparent part may be constituted by a transparent material or openings where the reflected pattern is placed on straight or curved beams. The device also includes a second plane surface comprising a second diffractive pattern and being parallel to the first surface. The two diffractive patterns are adapted to diffract light within a chosen range of wavelengths, the second surface being positioned below and parallel to the first surface so that they constitute a pair wherein said first and second diffractive patterns being essentially equal and overlapping. The device also comprising displacement means for allowing one of the patterns to move relative to the other in a direction parallel to said surfaces the device thus providing a movement sensitive diffraction pattern as the total diffraction from the pair of diffractive patterns change with a lateral, relative movement between the two surfaces. The diffractive patterns will preferably be chosen to be reflective, but transparent is also possible depending on the positioning of light source and detector and other practical considerations.

The diffractive patterns are preferably constituted by reflective lines, where the second surface in pattern also include etched grooves having reflective surfaces between the lines constituting the pattern. The grooves may have an etch depth of lambda/4, where lambda is a chosen wavelength of light within a chosen illumination spectrum, or possibly 2n+1λ/4 where n is an integer, if a transparent solution is chosen the second surface is partially reflective in the grooves as well as the pattern.

The device may include at least two pairs of diffraction patterns placed on the same two surfaces, said patterns pairs having at least partially directional features having different orientations thus providing a sensitivity to movements in corresponding different directions, thus being able to provide a sensitivity for movements in at least two directions. The different orientations may e.g. be perpendicular to each other or 0, 120 or 240° in said surface plane.

The diffraction patterns may be linear, but are preferably constituted by focusing diffractive lenses focusing the light to a chosen point, e.g. for being received by a detector.

Alternatively two or more pairs of diffraction patterns may be offset in-plane in a chosen direction along said surfaces in order to give similar optical signal relative to the lateral position of the two surfaces, but with an phase offset.

One of the surfaces in each pair may be coupled to the other through a spring and being provided with a known mass. Thus the device constitutes an acceleration or vibration sensitive device. The device may also be adapted to only allow displacement in the one direction that is to be measured, or the spring may allow movements in different directions in the plane, e.g. perpendicular so as to measure movements in any direction in the plane.

According to the invention, the device may be implemented in a system also comprising illumination means including at least one light source transmitting light at said chosen wavelength toward said patterns and detector means for receiving light diffracted by said patterns. The detector means may be adapted to measure the diffracted light and be coupled to analyzing means for measuring the movement.

Both light emitted from the light source and light received by the detectors may be transmitted through light guides, depending on practical considerations.

The device in the system may include a number of pattern pairs, said detector means being adapted to receive light from the individual pattern pairs, but alternatively the system may include several devices where each includes a pattern pair the detector means being adapted to receive light from the individual pattern pairs.

In addition each device may comprise a diffraction pattern pair being coupled to the other through a spring, the moveable part being provided with a known mass, thus constituting an acceleration sensitive device, said system thus constituting a three dimensional acceleration sensor.

A device according to the invention may also be provided with a coarse displacement sensor according to the known art in combination with the displacement sensor based on a deformable diffractive optical element, and where the coarse element is used to measure the larger displacements i.e. the orientation of a geophone or an accelerometer. The coarse displacement sensor may be a deformable diffractive optical element with longer periods. The coarse displacement sensor is made of one or more apertures and a moving optical element, where the coarse displacement modulates the amount of light reflected or transmitted, this moving optical element may be a diffractive element or a diffractive lens.

In addition, in an embodiment comprising more than one pair of diffractive elements, periods in the diffraction pattern are used to reconstruct the signal, giving a measurement of the absolute displacement.

The system according to the invention may comprise at least one photodetector adapted to measure the light intensity diffracted in one or several diffraction orders, this giving a measurement of the position of a surface relative to the other in a direction in-plane with the two surfaces. The light to and/or from said lightsource or/and photodetectors may be transmitted through at least one optical fibers, and at least two light sources may be used to illuminate each diffraction patter pair in order to cancel fluctuation in illumination intensity.

The system may be provided with means for measuring displacement of three elements in their three respective orthogonal directions, using a common light source for illumination, wherein one diffractive patter in each pair is placed on extensions of the moving elements, being positioned such that they are placed close to each other.

REFERENCES

[1] JP 2011014897/EP 2 482 040 A2 Optical Encoder with Misalignment Detection and Adjustment Method Associated Therewith
[2] WO 2008/030681 INTERFEROMETRIC POSITION ENCODER EMPLOYING SPATIAL FILTERING OF DIFFRACTION ORDERS
[3] Higurashi and Renshi Sawada, Micro-encoder based on higher-order diffracted light interference, 2005 J. Micromech. Microeng. 15 1459
[4] Highly-sensitive displacement-measuring optical device, US 2004/0130728 A1 and US 2006/0192976 A1
[5] Optical displacement sensor element, US 2005/0018541
[6] Stowe, D., and Tsung-Yuan Hsu. "Demodulation of interferometric sensors using a fiber-optic passive quadrature demodulator." Lightwave Technology, Journal of 1.3 (1983): 519-523.
[7] Brown, David A., et al. "A symmetric 3×3 coupler based demodulator for fiber optic interferometric sensors," SPIE, Fiber Optic and Laser Sensors IX Vol. 1584 (1991)
[8] Reid. Greg J., and David A. Brown. "Multiplex architecture for 3×3 coupler based fiber optic sensors." SPIE, Distributed and Multiplexed Fiber Optic Sensors RI, Boston (1993).
[9] US2003128361 (A1)—LIGHT MODULATION APPARATUS AND OPTICAL SWITCH, MOVEMENT DETECTING DEVICE AND DISTANCE MEASURING DEVICE, ALIGNMENT DEVICE AND SEMICONDUCTOR ALIGNER, AND PROCESSES THEREOF
[10] U.S. Pat. No. 7,173,764 (B2)—Apparatus comprising a tunable nanomechanical near-field grating and method for controlling far-field emission

The invention claimed is:

1. A displacement sensor device comprising:
a first at least partially transparent plane surface with a first reflective diffraction pattern,
a second plane surface comprising a second reflective diffraction pattern, the first and second diffraction patterns being adapted to diffract light within a chosen range of wavelengths, the second surface being positioned below and parallel to the first surface,
wherein the first and second diffraction patterns constitute a first pattern pair,
a second pattern pair placed on the first and second surfaces, said first and second pattern pairs having at least partially directional features having different orientations thus providing sensitivity to movements in corresponding different directions,
wherein said first and second diffraction patterns are separated by a chosen distance,
a first spring for allowing a movement of the first and second pattern pairs in a first direction parallel to the first and second surfaces, and
a second spring for allowing movement of the first and second pattern pairs in a second direction parallel to the first and second surfaces and perpendicular to the first direction.

2. The device according to claim 1, wherein said distance is less than ten illumination wavelengths.

3. The device according to claim 2, wherein said distance is less than five illumination wavelengths.

4. The device according to claim 1 wherein said second reflective diffraction pattern includes grooves having an etch depth of lambda/4, where lambda is a chosen wavelength of light within a chosen illumination spectrum.

5. The device according to claim 1, wherein said different orientations, for the first and second pattern pairs, have perpendicular orientations relative to the first and second surfaces.

6. The device according to claim 1, wherein said first and second diffraction patterns are constituted by focusing diffractive lenses.

7. The device according to claim 1, comprising at least the first and second pattern pairs being offset in-plane in a chosen direction along the first and second surfaces in order to give similar optical signal relative to a lateral position of the first and second surfaces, but with a phase offset.

8. The device according to claim 1, comprising at least the first and second pattern pairs being offset perpendicular to each other in order to give similar optical signal relative to a lateral position of the first and second surfaces, but with a phase offset.

9. The device according to claim 1 wherein said first and second springs are provided with a known mass such that the device constitutes an acceleration sensitive device.

10. The device according to claim 9, wherein each of the springs is adapted to allow displacement in only one direction that is to be measured.

11. The device according to claim 1, wherein a coarse displacement sensor is combined with the displacement sensor device based on a deformable diffractive optical element, and where the coarse displacement sensor is used to measure an orientation of a geophone or an accelerometer.

12. The device according to claim 11, where the coarse displacement sensor is a deformable diffractive optical element.

13. The device according to claim 11, where the coarse displacement sensor is made of one or more apertures and a moving optical element, where the coarse displacement sensor modulates an amount of light reflected or transmitted.

14. The device according to claim 13, where the moving optical element is a diffractive element or a diffractive lens.

15. The device according to claim 1, including at least the first and second pattern pairs each generating a signal with a phase offset, thus being used to reconstruct a lateral displacement over a plurality of periods of the signals.

16. A measuring system, comprising:
a first device, comprising:
a first at least partially transparent plane surface with a first reflective diffraction pattern,
a second plane surface comprising a second reflective diffraction pattern, the first and second diffraction patterns being adapted to diffract light within a chosen range of wavelengths, the second surface being positioned below and parallel to the first surface,
wherein the first and second diffraction patterns constitute a pattern pair,
wherein said first and second diffraction patterns are separated by a chosen distance, and
a spring for allowing a movement in a direction parallel to the first and second surfaces, the first device thus providing a movement sensitive diffraction pattern,
a second device including a pattern pair having a sensitivity direction being perpendicular to said first device,
a third device including a pattern pair having a sensitivity direction being perpendicular to said first and second devices,
at least one light source for transmitting light at said chosen wavelength toward said first and second diffraction patterns, and
a detector for receiving light diffracted by said first and second diffraction patterns,
wherein the first, second, and third devices are each connected to a respective extension structure that overlies and extends away from each device,
wherein each respective extension structure ends in a same area.

17. The system according to claim 16, wherein said detector is adapted to receive light from each of the pattern pairs.

18. The system according to claim 16, wherein said detector is adapted to receive light from the pattern pair of the second device.

19. The system according to claim 16, wherein each of the pattern pairs is coupled to another of the pattern pairs through a spring and being provided with a known mass, thus constituting an acceleration sensitive device, said system thus constituting a three dimensional acceleration sensor.

20. The system according to claim 16, further comprising at least one photodetector adapted to measure light intensity diffracted in one or several diffraction orders, thus giving a measurement of position of a surface relative to the other in a direction in-plane with the first and second surfaces.

21. The system according to claim 20, wherein the light to or from said light source or said photodetector is transmitted through at least one optical fiber.

22. The system according to claim 16, wherein at least two light sources illuminate the pattern pairs in order to cancel fluctuation in illumination intensity.

23. A method, comprising:
measuring displacement of three elements in three respective orthogonal directions,
using a common light source for illumination,
wherein the method is performed using a system comprising:
a first device, comprising:
a first at least partially transparent plane surface with a first reflective diffraction pattern,
a second plane surface comprising a second reflective diffraction pattern, the first and second diffraction patterns being adapted to diffract light within a chosen range of wavelengths, the second surface being positioned below and parallel to the first surface,
wherein the first and second reflective diffraction patterns constitute a first pattern pair,
wherein said first and second diffraction patterns are separated by a chosen distance, and
a spring for allowing a movement in a direction parallel to the first and second surfaces, the first device thus providing a movement sensitive diffraction pattern,
the common light source transmitting light at said chosen wavelength toward said patterns,
a detector for receiving light diffracted by said patterns,
a second device including a second pattern pair,
wherein said detector is adapted to receive light from the first and second pattern pairs, and
a third device including a third pattern pair having a sensitivity direction being perpendicular to said first and second devices, and
wherein each pattern pair is placed on a respective extension structure that overlies and extends away from each pattern pair, such that movements of each pattern pair may be measured in a same area.

24. The device according to claim 1, further comprising a center structure configured to allow movement in a third direction perpendicular to the first and second directions.

* * * * *